(12) United States Patent
Saund

(10) Patent No.: US 8,724,911 B2
(45) Date of Patent: May 13, 2014

(54) GRAPH LATTICE METHOD FOR IMAGE CLUSTERING, CLASSIFICATION, AND REPEATED STRUCTURE FINDING

(75) Inventor: Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 44 days.

(21) Appl. No.: 12/883,503

(22) Filed: Sep. 16, 2010

(65) Prior Publication Data

US 2012/0070091 A1    Mar. 22, 2012

(51) Int. Cl.
| G06K 9/62 | (2006.01) |
| G06K 9/46 | (2006.01) |
| G06K 9/68 | (2006.01) |
| G06K 9/56 | (2006.01) |
| G06F 7/00 | (2006.01) |

(52) U.S. Cl.
USPC ........... 382/225; 382/194; 382/202; 382/204; 382/218; 382/306; 707/729

(58) Field of Classification Search
USPC ................. 382/225, 194, 202, 204, 218, 306; 707/729
See application file for complete search history.

(56) References Cited

U.S. PATENT DOCUMENTS

| 4,649,498 | A  | * | 3/1987  | Kedem et al. ................. 345/420 |
| 5,204,915 | A  | * | 4/1993  | Nishida .......................... 382/198 |
| 5,515,455 | A  | * | 5/1996  | Govindaraju et al. ........ 382/186 |
| 5,841,900 | A  | * | 11/1998 | Rahgozar et al. ............. 382/176 |
| 6,556,983 | B1 |   | 4/2003  | Altschuler et al. |
| 7,106,330 | B2 | * | 9/2006  | Liu et al. ....................... 345/440 |
| 7,333,105 | B2 | * | 2/2008  | Slabaugh et al. ............. 345/420 |
| 7,567,715 | B1 | * | 7/2009  | Zhu et al. ...................... 382/232 |
| 7,676,552 | B2 |   | 3/2010  | Eilam et al. |
| 7,729,538 | B2 | * | 6/2010  | Shilman et al. ............... 382/181 |
| 7,761,836 | B1 |   | 7/2010  | Wadland et al. |
| 7,822,264 | B2 | * | 10/2010 | Balslev et al. ................ 382/154 |
| 7,979,449 | B2 |   | 7/2011  | Holster |
| 8,054,170 | B1 | * | 11/2011 | Brandt et al. ................. 340/453 |
| 2002/0168093 | A1 | * | 11/2002 | Sanders et al. ................ 382/125 |
| 2003/0208285 | A1 |   | 11/2003 | Regli et al. |
| 2004/0015833 | A1 |   | 1/2004  | Dellarocas et al. |
| 2004/0184642 | A1 | * | 9/2004  | Miyasaka ...................... 382/124 |
| 2005/0192986 | A1 |   | 9/2005  | Butler |
| 2005/0198244 | A1 |   | 9/2005  | Eilam et al. |
| 2005/0204131 | A1 |   | 9/2005  | Kovarik |
| 2005/0281467 | A1 | * | 12/2005 | Stahovich ...................... 382/202 |
| 2006/0104484 | A1 | * | 5/2006  | Bolle et al. .................... 382/115 |
| 2006/0182317 | A1 | * | 8/2006  | Neumann et al. ............. 382/124 |

(Continued)

OTHER PUBLICATIONS

Levinson et al., "Multi-Level Hierarchical Retrieval", UC Santa Cruz Tech Report, Technical Report: UCSC-CRL-92-36, 1992, later published in 6th Annual Conceptual Graphs Workshop, Oct. 2, 1996.

U.S. Patent Application No. entitled "A Method for Generating a Graph Lattice From a Corpus of One or More Data Graphs", by Eric Saund, filed Sep. 16, 2010.

(Continued)

*Primary Examiner* — Kathleen Y Dulaney
(74) *Attorney, Agent, or Firm* — Fay Sharpe LLP

(57) ABSTRACT

A document recognition system and method, where images are represented as a collection of primitive features whose spatial relations are represented as a graph. Useful subsets of all the possible subgraphs representing different portions of images are represented over a corpus of many images. The data structure is a lattice of subgraphs, and algorithms are provided means to build and use the graph lattice efficiently and effectively.

19 Claims, 14 Drawing Sheets

(56) References Cited

U.S. PATENT DOCUMENTS

| | | | |
|---|---|---|---|
| 2006/0215923 A1* | 9/2006 | Beatty | 382/253 |
| 2006/0227140 A1* | 10/2006 | Ramani et al. | 345/441 |
| 2007/0127816 A1* | 6/2007 | Balslev et al. | 382/181 |
| 2007/0172125 A1* | 7/2007 | Walch | 382/186 |
| 2007/0263932 A1* | 11/2007 | Bernardin et al. | 382/187 |
| 2008/0123959 A1 | 5/2008 | Ratner et al. | |
| 2008/0240551 A1* | 10/2008 | Zitnick et al. | 382/159 |
| 2009/0324107 A1* | 12/2009 | Walch | 382/224 |
| 2010/0073678 A1 | 3/2010 | Smith et al. | |
| 2010/0135533 A1* | 6/2010 | Kanda | 382/106 |
| 2010/0232686 A1* | 9/2010 | Dewan et al. | 382/159 |
| 2010/0322500 A1* | 12/2010 | Dewaele | 382/132 |
| 2011/0013837 A1* | 1/2011 | Bergman et al. | 382/173 |
| 2011/0221769 A1* | 9/2011 | Leung et al. | 345/633 |
| 2011/0293189 A1* | 12/2011 | Sun et al. | 382/195 |
| 2012/0047180 A1 | 2/2012 | Kirshenbaum | |
| 2012/0069024 A1 | 3/2012 | Saund | |

OTHER PUBLICATIONS

EP Search Report, EP App. No. 11180687.3-1901/2431918, mailed Mar. 15, 2013, completed Mar. 7, 2013, The Hague.

Jiang, Chuntao et al., "Graph-Based Image Classification by Weighting Scheme", Applicatoins and Innovations in Intelligent Systems XVI, Jan. 1, 2009, Springer, London, pp. 63-76.

Ozdemir, B. et al., "Image Classification Using Subgraph Histogram Representation", (ICPR) 2010 20th Int'l Conf. on Pattern Recognition, IEEE, Piscataway, NJ, Aug. 23, 2010, p. 1112-1115.

Akbar, Monica et al., "Frequent Pattern-Growth Approach for Document Organization", Proc. of 2nd Int'l Workshop on Ontologies and Information Systems for the SEmantic Web, ONISW Jan. 1, 2008, pp. 77-82.

Barbu, E. et al., "Clustering Document Images Using a Bag of Symbols Representation", 8th Int'l Proceeding on Document Analysis and Recognition, IEEE, Aug. 21, 2005, pp. 1216-12120.

* cited by examiner

| SUBGRAPH SIZE(S) | FEATURE VECTOR SIZE | ERRORS | SPURIOUS CLUSTERS | CLUSTER QUALITY (EDIT DISTANCE TO G.T.) |
|---|---|---|---|---|
| 1 | 13 | 6 | 18 | 24 |
| 1-2 | 87 | 3 | 5 | 8 |
| 1-3 | 534 | 0 | 1 | 1 |
| 1-4 | 2953 | 0 | 1 | 1 |

GRAPH LATTICE METHOD FOR IMAGE CLUSTERING, CLASSIFICATION, AND REPEATED STRUCTURE FINDING

BACKGROUND

The present exemplary embodiments relate generally to computer vision and more specifically document recognition which is an application for computer vision. They find particular application in conjunction with computer vision applications, such as clustering, classification, retrieval, and repeated structure finding, and will be described with particular reference thereto. However, it is to be appreciated that the present exemplary embodiments are also amenable to other like applications.

Recent years have seen a surge in bag-of-words approaches to image categorization. Under such approaches, objects and scenes are modeled as large vectors of relatively simple feature measurements. An issue is the information captured by a feature. Features have traditionally been purely appearance-based features, which measure local shape and texture properties. However, a recent trend has aimed at extracting information in spatial relationships among features measurements sampled at keypoints or interest points. A notable example of encoding geometry in localized features occurs in document image indexing, where "fingerprints" describe the spatial configurations of word blobs.

One way of encoding spatial configuration is through graphs. Therein, objects and scenes are modeled as parts (nodes) and relations (links). An observed image generates a graph of observed parts and their relations to other parts in the local neighborhood, and recognition is performed by subgraph matching.

Subgraph matching poses certain difficulties. First, it is known to be exponentially expensive. This problem is to some extent alleviated by use of attributed graphs (i.e., graphs whose nodes contain properties that constrain possible matches). Nonetheless, subgraph matching has been limited to relatively small subgraphs due to a second difficulty. This is that noise and variability cause observed graphs to deviate from ideal models. This demands the use of inexact graph matching techniques, which drastically increases matching cost and largely removes the advantages of attributed graph matching because possible matches of differently-labeled nodes must now be explored.

Similar to image categorization, the difficulties noted with subgraph matching also pose problems for image retrieval and detection of repeated structure. Namely, image noise and variability make it difficult to quickly and efficiently perform the matching necessary for carrying out said tasks.

In view of the foregoing, it would be advantageous to have methods and/or systems that address the foregoing problems. The disclosure hereafter contemplates such methods and/or systems.

BRIEF DESCRIPTION

A document recognition system and method, where images are represented as a collection of primitive features whose spatial relations are represented as a graph. Useful subsets of all the possible subgraphs representing different portions of images are represented over a corpus of many images. The data structure is a lattice of subgraphs, and algorithms provided to build and use the graph lattice efficiently and effectively.

DETAILED DESCRIPTION

Large families of complex image features, in the form of subgraphs, can be built out of simpler ones through construction of a graph lattice (i.e., a hierarchy of related subgraphs linked in a lattice). By supporting large numbers of these feature subgraphs, image structure can be captured through exact graph matching. Thus, as will be seen, a graph lattice facilitates efficient graph matching notwithstanding image noise and variability, which advantageously facilitates efficient image clustering, classification, retrieval, repeated structure finding and novelty detection. The following systems and methods are described in the domain of rectilinear line art, specifically to address practical problems of document form recognition. However, it is to be understood, the concepts are applicable to images other than rectilinear line art, which are capable of being broken down into a set of primitives.

1.0 OVERVIEW OF A GRAPH LATTICE

The basic framework, called "graph lattice," is a lattice of nodes, where each node corresponds to a subgraph representing image primitives and relations. The graph lattice nodes are related to each other in a lattice by adding (upward) and removing (downward) primitives from their respective subgraphs. For example, assuming the lattice extends from degree 1 to degree N, where primitives define degree 1, all the subgraphs of degree 1 are comprised of a subgraph of degree i−1 plus a primitive.

The idea is best illustrated in the domain of rectilinear line art for at least two reasons. First, rectilinear line art can be easily represented as graphs, since rule lines in the domain of rectilinear line art intersect in well-defined ways, forming junctions and free-end terminators. These junctions are well suited for use as nodes of a graph, and rule line segments linking junctions are well suited for use as links of the graph.

Second, rectilinear line art is common in documents, and, as noted above, the subject matter disclosed herein finds particular application in conjunction with image classification, retrieval, and duplicate detection, which are commonly used with documents.

Figure 1:
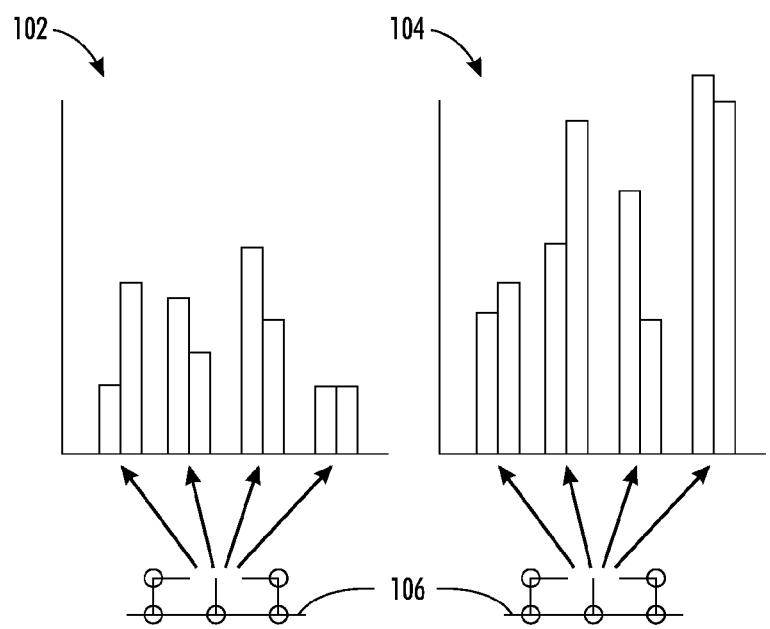
FIG. 1 illustrates examples of rectilinear line art and some of the repeating structure found within these examples.

FIG. 1 shows examples of rectilinear line art and some of the repeating structure found within these examples. As can be seen, a first image 102 and a second image 104 each include a rectilinear line art image of a bar chart. Further, within these images, there is repeating substructure, such as substructure 106. As shown by substructure 106, substructure can repeat within a single image and/or across multiple images. A graph lattice representation enables the discovery and use of substructures as subgraphs.

Figure 2:
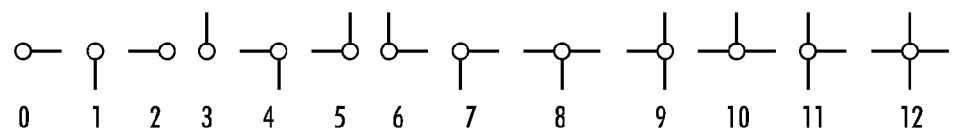
FIG. 2 illustrates that in the domain of rectilinear line art there are thirteen types of junctions.
Figure 3:
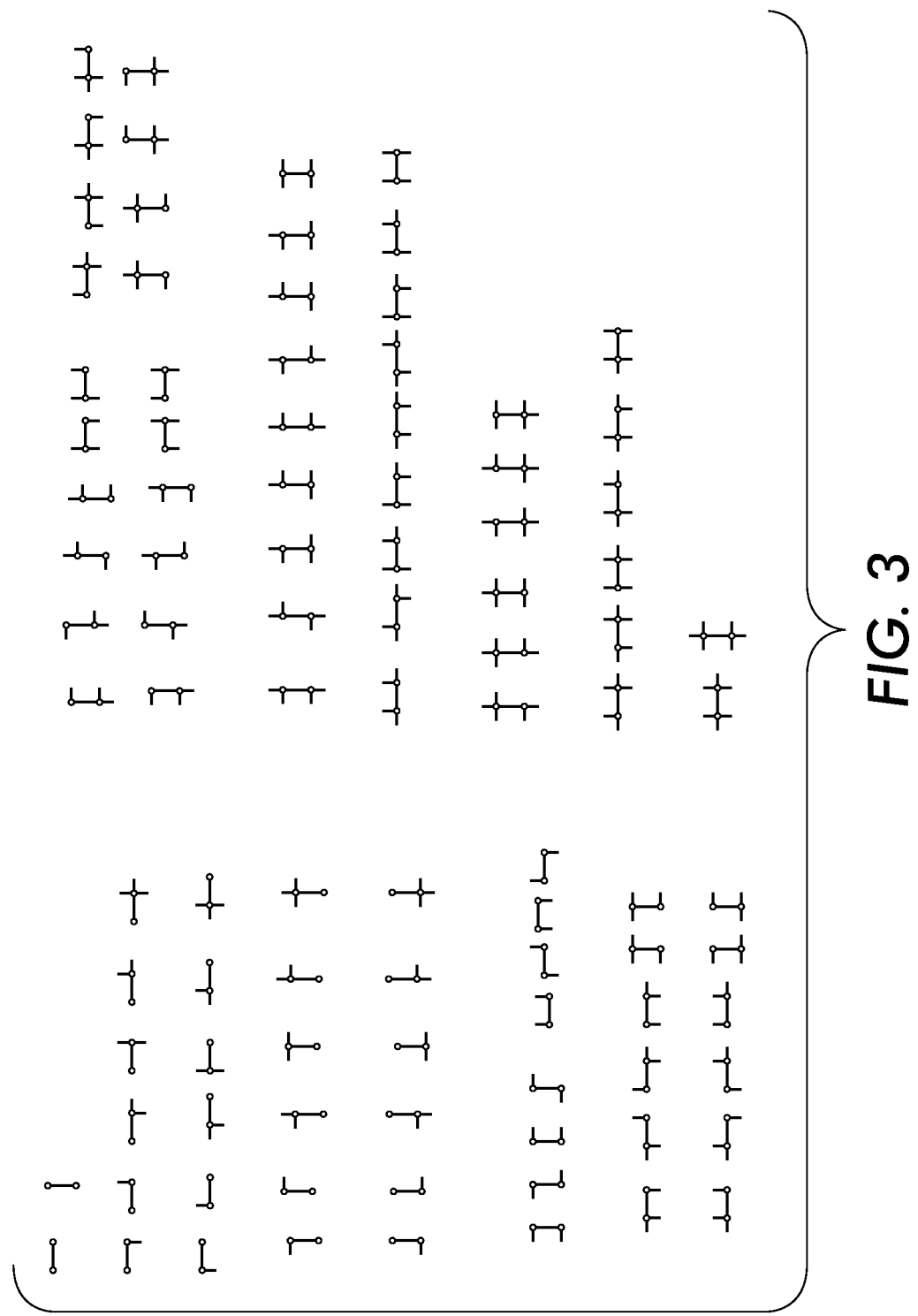
FIG. 3 illustrates that there are 98 possible pairings of primitives.

FIG. 2 defines thirteen types of junctions in the domain of rectilinear line art. These are the primitives, or first level subgraphs, of a graph lattice. The thirteen primitive junction types can be grouped according to their compatible link directions in much the same way atoms combine to form molecules. FIG. 3 shows that there are ninety-eight (98) possible pairings of these primitives, or, in other words, ninety-eight (98) subgraphs of degree 2. Two of these pairings form figures (e.g., the single horizontal and vertical line segment), which are subgraphs that do not have dangling line segments. The rest, however, have dangling line segments, whereby they can only be used as subgraphs of figures.

Figure 4:
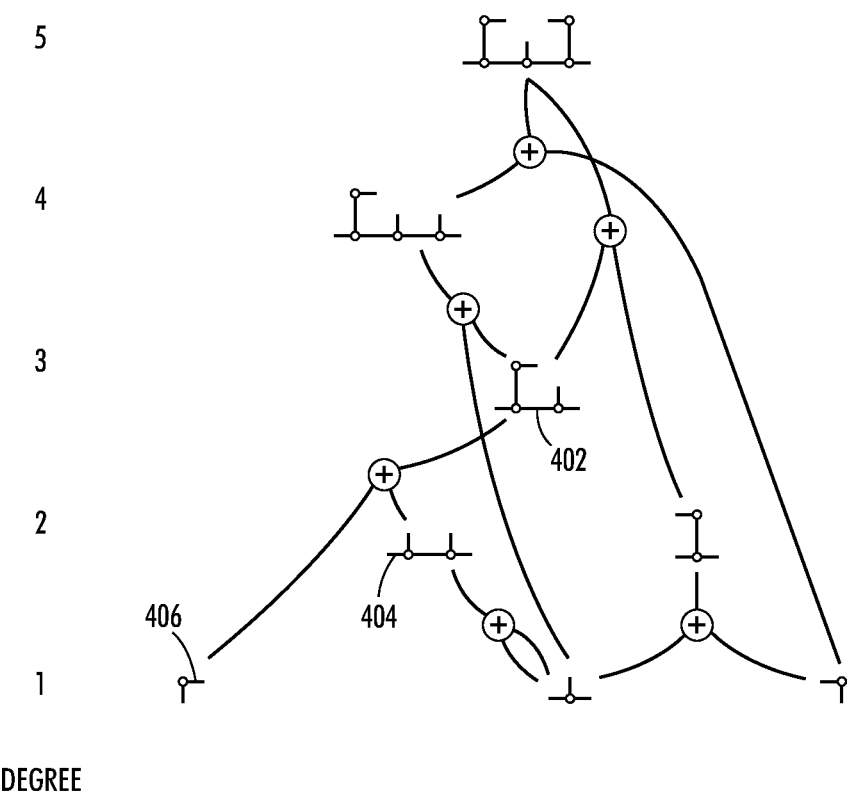
FIG. 4 illustrates parent-child relations that define a graph lattice.

Parent-child relations between primitives and subgraphs form a lattice. As a matter of terminology, smaller subgraphs are termed parent nodes and larger subgraphs generated from smaller subgraphs by adding junctions are termed child nodes. FIG. 4 illustrates the above concept. Therein, with exception to the primitives, each subgraph of degree i is comprised of a subgraph of degree i−1 and a primitive. For example, subgraph 402 of degree 3 is comprised of subgraph 404 of degree 2 and primitive 406 (also a subgraph of degree 1). Notwithstanding that the discussion herein assumes that child graph lattice nodes are always one degree larger than their parents, in certain embodiments two subgraphs of arbitrary size may be conjoined to create a larger subgraph.

To build a fully populated graph lattice of degree N, all thirteen primitives are appended onto all link-compatible locations of subgraphs of degree i to define all the subgraphs of degree i+1, where i extends from 1 to N−1. As should be appreciated, each level of the lattice acts as the base for the next layer. Further, building an entire graph lattice of degree N provides an abstract representation for the space of all possible figures containing N junctions and all subgraphs of each figure. Not surprisingly, however, fully populating a graph lattice grows astronomically above degree 3. This issue will be discussed in the following paragraphs.

Consider now a graph lattice representing only a single figure and all of its subgraphs, where the figure contains N junctions. This figure will define a single node in the graph lattice at degree N. Then at degree N−1 the figure will have N−1 nodes, each of which is a subgraph with one of its junctions missing. The number of nodes at degree N−2 will depend on the figure's topology. Thus, the graph lattice forms a diamond shape with a flattened base, where the base is comprised of thirteen nodes representing the primitives. The diamond will typically be widest at layers around $$\frac{N}{2},$$

where most combinations of present and missing junctions tend to occur. Thus, the total number of nodes in the graph lattice for a single figure is on the order of $2^N$.

Notwithstanding that the concept of a graph lattice was introduced in the context of rectilinear line art, it is to be appreciated that other formulations of are equally amenable. Namely, the concept of a graph lattice can be applied to other domains in which image features can be broken down into a set of primitives.

2.0 BUILDING A GRAPH LATTICE

After introducing some basic concepts involved with the generation of a graph lattice, an algorithm for building a graph lattice is introduced. Briefly, the algorithm manages the complexity of a graph lattice by only building the portion of the entire theoretical graph lattice that is meaningful and useful for a given data corpus and set of applications.

In this discussion, a data corpus is a collection of data graphs, where each data graph corresponds to an image. The image might be, for example, a document image. A data graph represents an image using primitives, discussed above, where nodes in the data graph correspond to primitives and edges in the data graph correspond to links between the junctions. In the case of rectilinear line art, a data graph of an image is constructed by extracting the rule lines to determine the junctions formed thereby. These junctions then define nodes of the data graph, which are interconnected according to the rule lines.

Figure 5:
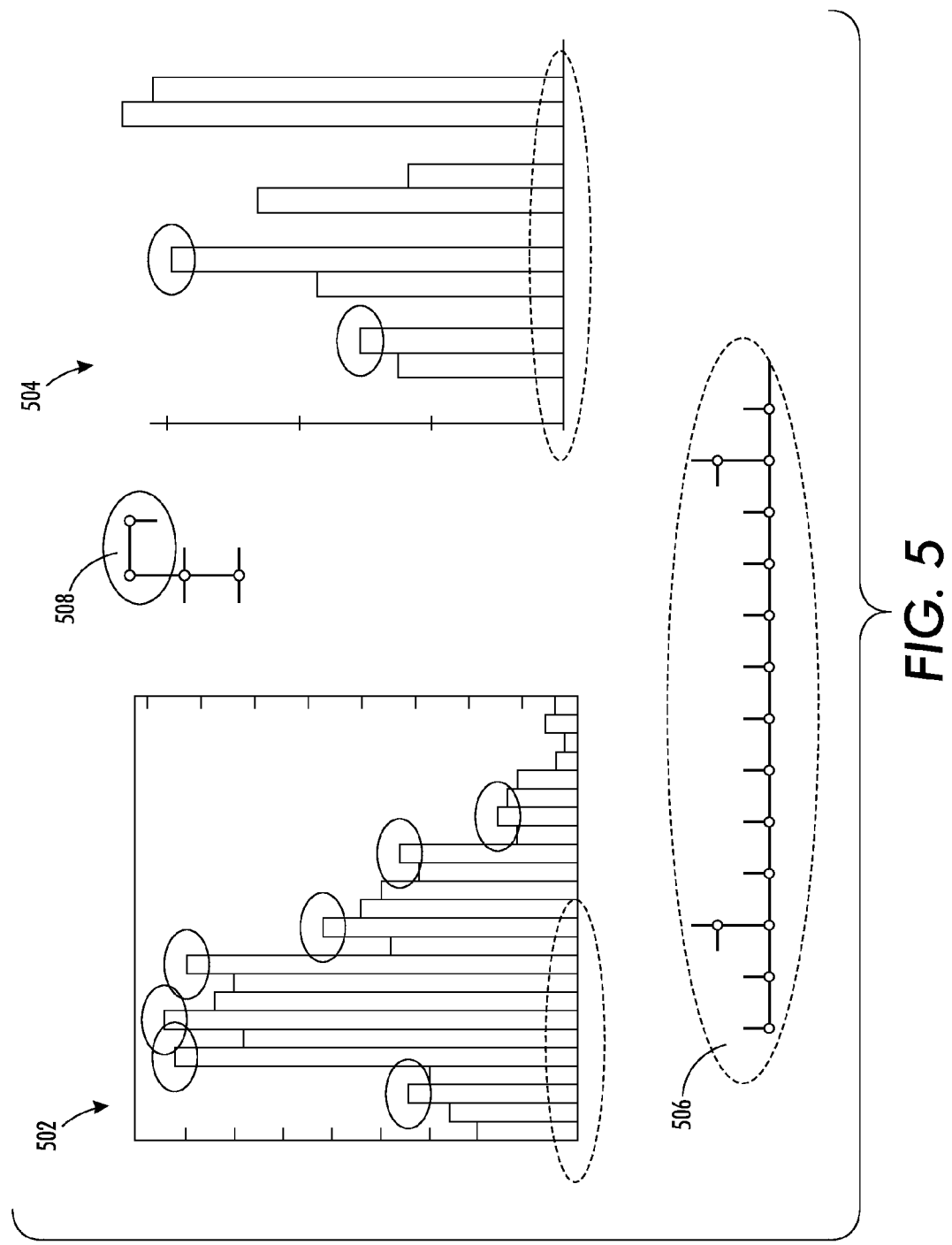
FIG. 5 illustrates two images which might be used to build a graph lattice.

FIG. 5 is illustrative in explaining a concept used in building a graph lattice. Suppose it is desirable to build a graph lattice for the data graphs of the two images 502, 504 of FIG. 5. Further, suppose the data graph of each image is comprised of N junctions. As noted above, if N>3, it is generally impractical to build a fully populated graph lattice. Thus, to address this problem, the graph lattice is only populated with subgraphs found in the data graphs of both of the two images 502, 504, such as subgraphs 506, 508.

2.1 Struts

A graph lattice node at a lower level (degree) may be a subgraph of a graph lattice node at a higher level. To limit complexity, only parent-child relations between graph lattice node triples are maintained. These triples consist of a node at level N (the parent), a primitive (and technically a second parent), and a node at level N+1 which is the subgraph consisting of the parent graph lattice node subgraph plus the primitive linked to its perimeter (the child). This three-way relation is maintained in a data structure called a strut.

The purpose of a strut is twofold. First, it maintains the junction index mapping between a parent and child graph lattice node. In general, any graph lattice node will index its component junctions in arbitrary order, and a strut keeps those organized between parent and child graph lattice nodes. Second, a strut indicates the primitive type, placement on the parent, and links for the junction that constructs the child from the parent.

Figure 6:
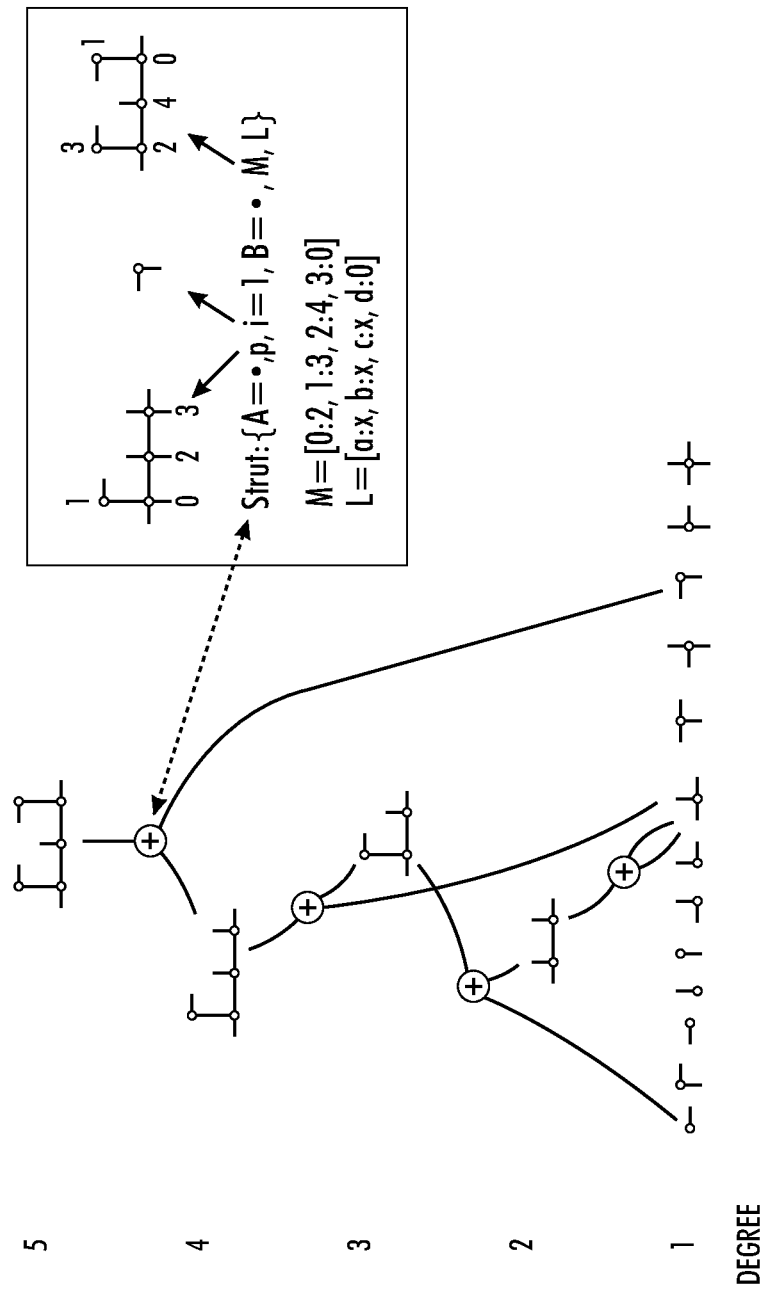
FIG. 6 illustrates the concept of a strut.

Referring to FIG. 6, the concept of a strut is illustrated. A strut maintains pointers to its constituent graph lattice nodes, and these nodes maintain links to all struts that connect them. A strut is denoted as S {A, p, i, B, M, L}, where A is the parent graph lattice node; p is the type of the primitive added to the parent to create the child; i is the index of this primitive in the child subgraph; B is the child subgraph (graph lattice node); M is the mapping between parent junction indices and child junction indices; and L is the linkage of the primitive into the parent to create the child subgraph. L maps from direction indices on the added primitive to node indices of the child.

Graph lattice nodes maintain lists of struts they participate in. However, in certain embodiments, the primitives do not maintain these lists for the sake of economy. In such embodiments, primitives only keep lists of struts where both parents are primitives and the child is a degree 2 graph lattice node.

2.2 Mappings

Figure 7:
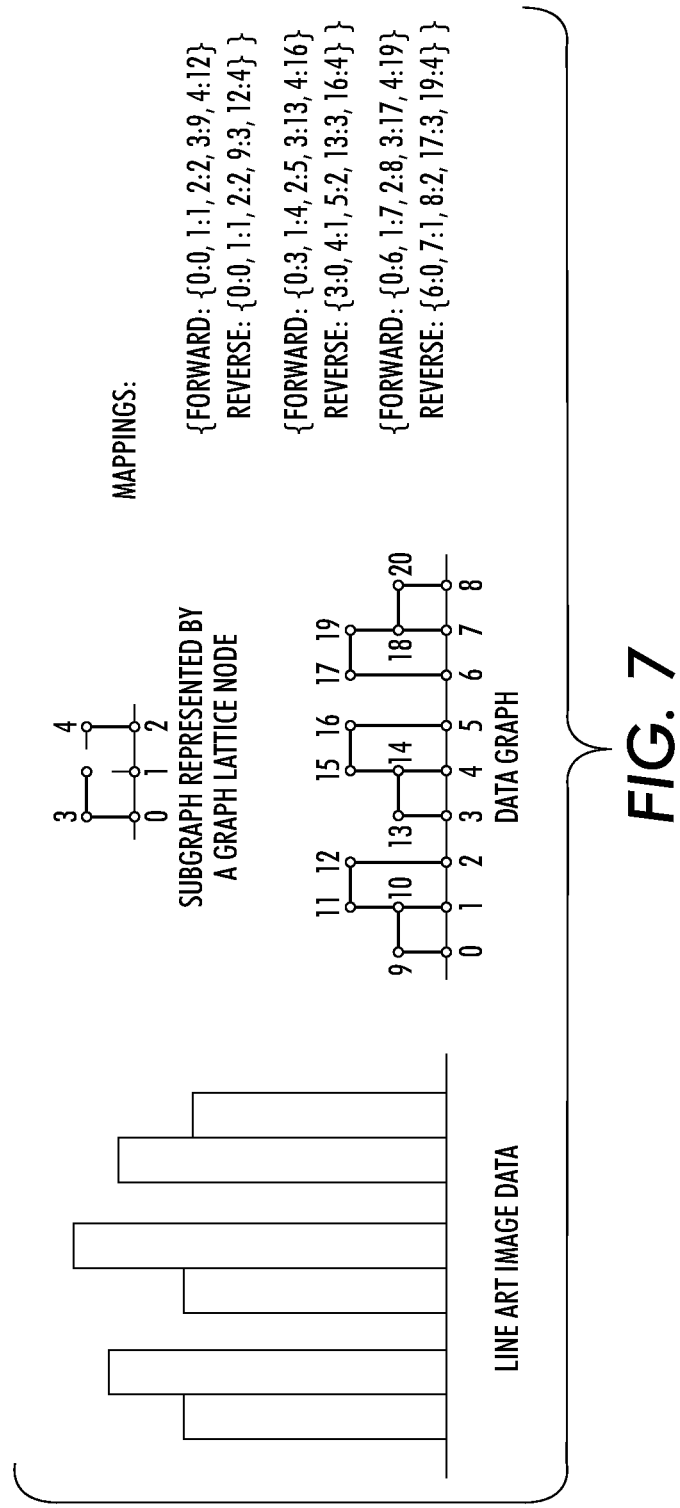
FIG. 7 illustrates mappings between an example data graph and a graph lattice node's subgraph.

Each graph lattice node is itself a subgraph. As such, a node can be matched to an observed data graph by mapping the graph lattice node's subgraph junctions to corresponding data graph junctions. Because the primitives are typed, this matching can be performed by any well-known algorithm for attributed subgraph matching. FIG. 7 illustrates the resulting mappings between an example data graph and a graph lattice node's subgraph. In general such a mapping will be one-to-many (i.e., a single subgraph represented by a graph lattice node may map to multiple portions of an observed data graph).

Mappings are maintained in a data structure called herein a MappingSet. A MappingSet consists of a triple: {graph lattice node, DataGraphID, list-of-Mappings}. A DataGraphID is a pointer to a data graph and its associated original image (e.g., a filename). A list-of-Mappings is a list of mappings, each of which is a pair: {forward-mapping-array, reverse-mapping-array}. A forward-mapping-array is an array having a size equal to the degree of the graph lattice node. This array maps from node indices of the graph lattice node's subgraph onto indices of nodes in the data graph. A reverse-mapping-array is an array or hashtable that maps from node indices of the data graph to node indices of the subgraph represented at the graph lattice node. As the data graph will be very large, it is more space-efficient to store the reverse-mapping as a hashtable (with collision detection) instead of as an array having a length equal to the size of the data graph.

Each graph lattice node maintains a list called MappingSets. These MappingSets record the identities and locations on data graphs a graph lattice node's subgraph has been mapped to. Accordingly, each graph lattice node includes a MappingSet for each data graph its subgraph has been mapped to.

2.3 Accepted and Candidate Nodes

At any given time a list of Accepted graph lattice nodes and a list of Candidate graph lattice nodes are maintained. The purpose of these lists is described in more detail below, but, briefly, Accepted graph lattice nodes are nodes that have been added to the graph lattice and Candidate graph lattice nodes are nodes being considered for addition to the graph lattice nodes. As a starting condition, a list of primitives is used for the Accepted graph lattice nodes and an empty set is used for the initial Candidate graph lattice nodes.

Further, the sets of Candidate and Accepted graph lattice nodes are each maintained in a data structure consisting of an array indexed by degree (number of primitives). Each element of this array consists of a hashtable indexed by the combinations of numbers of primitives. For example, a hash index may be computed using the Java hashing function on a string concatenated from digits counting the number of matches of each primitive to a data graph. The purpose of this data structure is to make it efficient to detect duplicate graph lattice nodes.

In certain embodiments, each Accepted and Candidate graph lattice node maintains a count of the number of primitives it is built from so as to more efficiently facilitate indexing by degree. As should be appreciated, the count of a graph lattice node's primitives corresponds to the degree, or level, of the graph lattice node.

2.4 Algorithm

Figure 8:
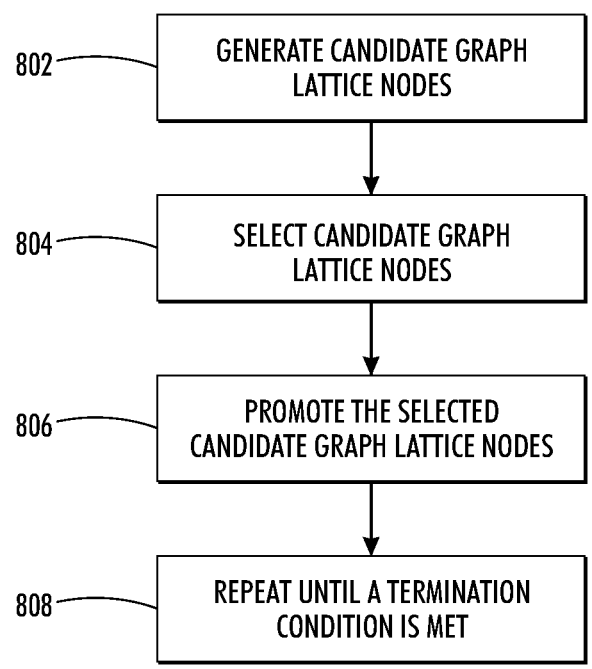
FIG. 8 illustrates an algorithm for generating a graph lattice.

A basic algorithm for generating a graph lattice is shown in FIG. 8. The algorithm takes as input a set of data exemplars, each of which is a data graph consisting of nodes representing primitive elements and links representing relations among primitive elements. These exemplars allow the graph lattice to be narrowly tailored for the use at hand by only generating subgraphs that can be mapped to the data exemplars. The algorithm includes generating Candidate graph lattice nodes (Action 802), selecting Candidate graph lattice nodes (Action 804), promoting the selected graph lattice nodes (Action 806), and repeating until a termination condition is met (Action 808).

To begin, Candidate graph lattice nodes are generated from Accepted graph lattice nodes and observed data graphs (Action 802). In the way of overview, mappings of Accepted graph lattice nodes onto observed data graphs are examined and used to spawn new Candidate graph lattice nodes. Observed data graphs may include previously seen data graphs and/or new, novel, previously unobserved data graphs. As noted above, the Accepted graph lattice nodes are initially comprised of a list of primitives.

The first step in generating Candidate graph lattice nodes is to generate extensions of Accepted graph lattice nodes of degree N. Every mapping of a Level N graph lattice node onto an observed data graph can serve as a seed for spawning new Level N+1 graph lattice nodes which are supergraphs of the subgraph represented by that graph lattice node. Each primitive linked to the perimeter of the subgraph can itself give rise to a subgraph one node larger in size, and therefore one degree (level) higher in a graph lattice. This is hereafter referred to as an extension of a graph lattice node.

Figure 9:
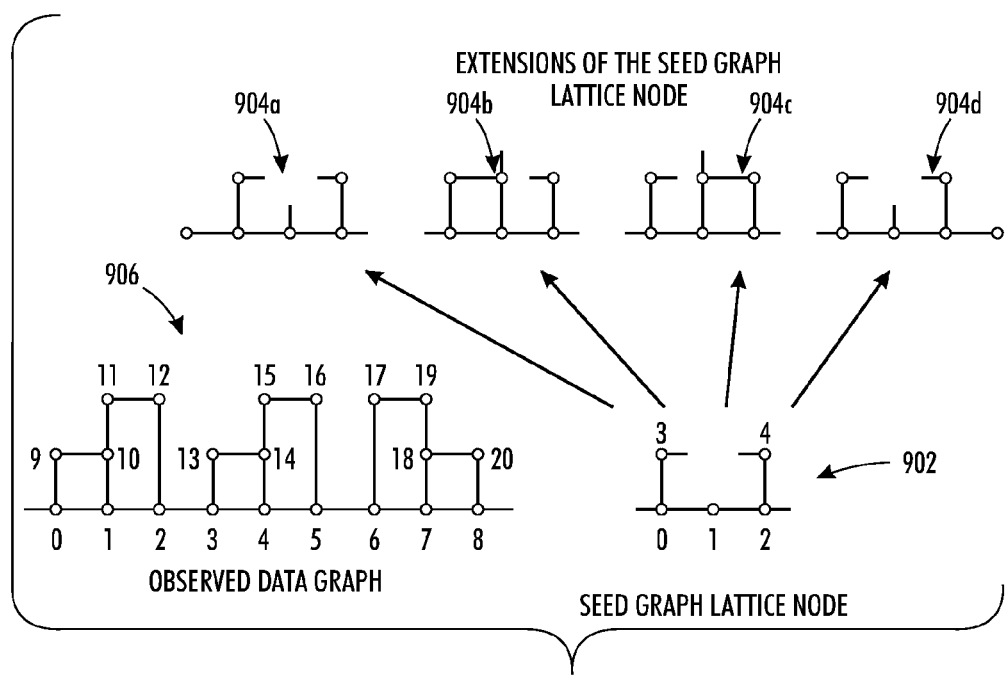
FIG. 9 illustrates the concept of an extension.

Referring to FIG. 9, this concept is illustrated. Therein, a seed graph lattice node 902 is used to spawn four extensions 904a-904d. For this example, it is to be understood, each extension is of degree 6, which is one degree higher than the seed graph lattice node. Further, each extension is found within an observed data graph 906.

Before being added as a new level N+1 Candidate graph lattice node, each extension generated by every level N Accepted graph lattice node is compared with the existing graph lattice at level N+1 to make sure it does not duplicate an existing Accepted or Candidate graph lattice node. This duplication check is facilitated by the hashtable indexing of graph lattice nodes described above. Through the hashtable, the set of possibly identical level N+1 graph lattice nodes that have to be compared by actual graph matching is narrowed down to only a small number of Candidate graph lattice nodes.

If an extension is found not to be duplicated, it is added to the list and hashtable of Candidate graph lattice nodes at level N+1. Each new Candidate graph lattice node is then also linked into the data graph(s) it maps to through struts. The strut linking this new Candidate graph lattice node with its level N parent and associated primitive is obvious. But because of the lattice nature of the graph lattice, other level N graph lattice nodes may also be subgraphs of the new extension. Struts for these relations must be formed as well.

Once the Candidate graph lattice nodes are generated (Action 802), some of the Candidate graph lattice nodes are selected for promotion to Accepted graph lattice nodes (Action 804). In general the goal is to grow the graph lattice so that the nodes added serve purposes of clustering, classification, repeated structure detection, or other applications of the graph lattice.

One method for selecting Candidate graph lattice nodes is a maximum node type diversity criterion. This method rank orders all Candidate graph lattice nodes by diversity of primi tive types, measured as the entropy $H_n$ of primitive node types i for node n, $$H = \sum_i -p_i \log p_i \quad (1)$$

$$p_i = \frac{c_i}{\sum_i c_i} \quad (2)$$

where $c_i$ is the count of the number of primitives of type i used in graph lattice node n. The node type diversity criterion leads to growing graph lattices that include nodes that contain many different types of junctions, which are often the most diagnostic subgraphs of a data graph for purposes of clustering and classification. Other selection criteria are also possible.

The Candidate graph lattice nodes previously selected (Action 804) are next promoted to Accepted graph lattice nodes (Action 806). By virtue of attaining Accepted status, a graph lattice node is eligible to serve as a seed to new Candidate graph lattice nodes.

After the Candidate graph lattice nodes are promoted (Action 806), the algorithm repeats until a termination condition is met (Action 808). Repetition is trivial since a newly promoted graph lattice node of degree N already refers to mappings to observed data graphs. These mappings are then easily followed to search for children of the promoted graph lattice node that represent subgraphs observed in the data samples that are not already represented by graph lattice nodes at level N+1.

Possible termination conditions include but are not limited to:
(i.) the graph lattice containing a threshold number of Accepted graph lattice nodes at a given level;
(ii.) the graph lattice containing a threshold number of Accepted graph lattice nodes in total;
(iii.) the list of Candidate graph lattice nodes being exhausted;
(iv.) quality measures for Candidate graph lattice nodes fall below a threshold; and
(v.) the runtime exceeding a determined period of time.

In certain embodiments, the termination condition is dependent on the acceptance strategy discussed in Action 804.

Notwithstanding the foregoing algorithm for building a data graph, it is to be appreciated that other algorithms are equally amenable. For example, one idea is selection of highly indicative Candidate graph lattice nodes using an entropy-based measure of node type diversity.

3.0 MATCHES TO AN OBSERVED DATA GRAPH

An operation to perform with a graph lattice is to compute its mappings to an observed data graph derived from one or more images. Because a graph lattice can become very large (containing thousands or hundreds of thousands of nodes) it is important to do this efficiently. A naive approach is to perform subgraph matching independently between an observed data graph and each graph lattice node's subgraph. However, a more efficient algorithm that exploits the lattice structure in the relations among graph lattice nodes is discussed hereafter.

Figure 10:
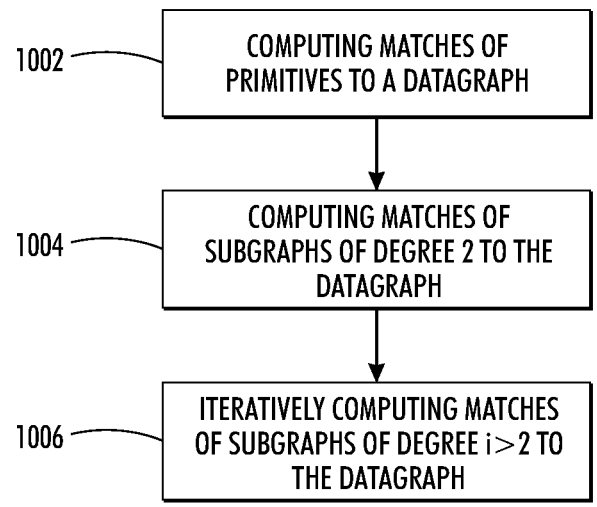
FIG. 10 illustrates an algorithm for computing mappings.

With reference to FIG. 10, an algorithm for computing mappings is illustrated. The algorithm takes as input a data graph and outputs a compilation of MappingSets describing all mappings from subgraphs represented by graph lattice nodes onto the data graph. The algorithm includes computing matches of primitives to nodes of the data graph (Action 1002), computing matches of subgraphs of degree 2 to the data graph (Action 1004), and iteratively computing matches of subgraphs of degree 3 and higher (Action 1006).

To begin, the subgraphs of degree 1 are matched to the data graph (Action 1002). A subgraph can be matched to an observed data graph by mapping the graph lattice node's subgraph junctions to corresponding data graph junctions.

After the subgraphs of degree 1 are matched (Action 1002), the subgraphs of degree 2 are mapped to the data graph (Action 1004). For each pair of primitives A and B, a determination is made as to whether they are parents of one or more struts to level 2 graph lattice nodes $C_1, C_2, \ldots, C_N$. If so, the algorithm iterates over all the mappings of A onto the data graph and determines whether $C_i$ is a valid mapping. The determination as to whether $C_i$ is a valid mapping is performed by testing the data graph for the existence of a link to primitive B in the correct proximity to A for that mapping.

Having mapped the subgraphs of degree 2 to the data graphs (Action 1004), mappings at levels 3 and greater are iteratively computed, starting at level 3 graph lattice nodes. For each graph lattice node B at level N (starting with N=3), the algorithm selects one strut S to a parent node A at the previous level. It is only necessary to consider one strut because in order for a mapping at level N to be found, all of the node's subgraphs at level N−1 will be mapped. For the level N−1 parent node A associated with the strut S, the algorithm then iterates over each of its mappings onto the data graph, and, for each such mapping, examines whether the primitive p indicated by the strut S is also present on the data graph and linked as indicated by the strut's linkage parameter L. If this primitive is present and appropriately linked then the mapping to B can be established.

The complexity of this procedure grows linearly with the number of parent-child struts in the graph lattice and linearly with the number of mappings between graph lattice nodes and the data graph. The important point is that at each level, only a small amount of work is needed to compute mappings because all mappings are incremental extensions to mappings found at the previous level.

Figure 11:
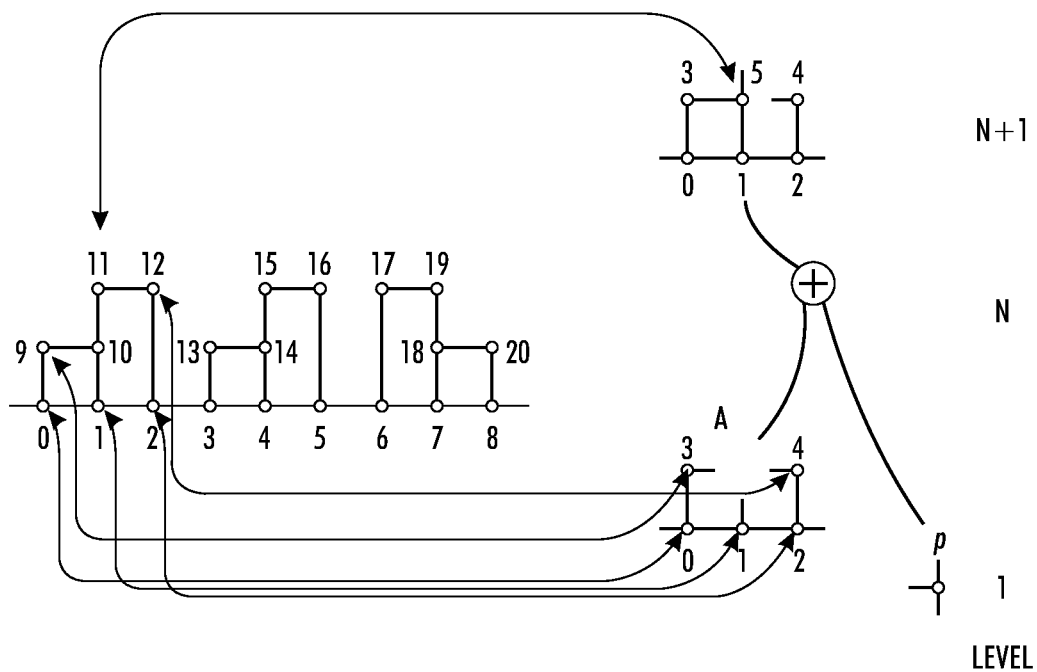
FIG. 11 illustrates core concept underlying the algorithm of FIG. 10.

Referring to FIG. 11, a concept underlying the matching algorithm is illustrated. Namely, the mapping of a graph lattice node B at level N+1 to a data graph is mostly inherited from the mapping of its parent graph lattice node A at level N to the data graph. The strut from A to B then indicates where on the data graph to test for the presence of the primitive p (index 5 on B). Thus, the matching algorithm undergoes an incremental mapping.

4.0 APPLICATIONS

The graph lattice framework supports several important uses in document recognition and other aspects of computer vision. However, before describing these, the next two sections describe a feature vector based on graph lattice mappings and an appropriate feature vector similarity measure.

4.1 Feature Vector: Junction-Normalized Mapping Count

Several uses of the graph lattice representation involve computing a feature vector based on mappings from a graph lattice to an observed data graph. Each graph lattice node comprises one element of the vector, and the vector entry for that element is derived from the number of mappings of that graph lattice node subgraph onto the data graph.

Testing has shown that a feature vector whose elements are pure (or straight) mapping counts does not perform well for line art clustering and classification. The reason has to do with overweighting of larger subgraphs. For larger subgraph features, a very large number of highly overlapping subgraphs are matched. Any node in the data graph (line-art junction) will participate in many more high-order subgraphs than low-order ones. This leads to instability in large numbers of match counts as a result of even small numbers of errors in detecting primitive junctions.

Figure 12:
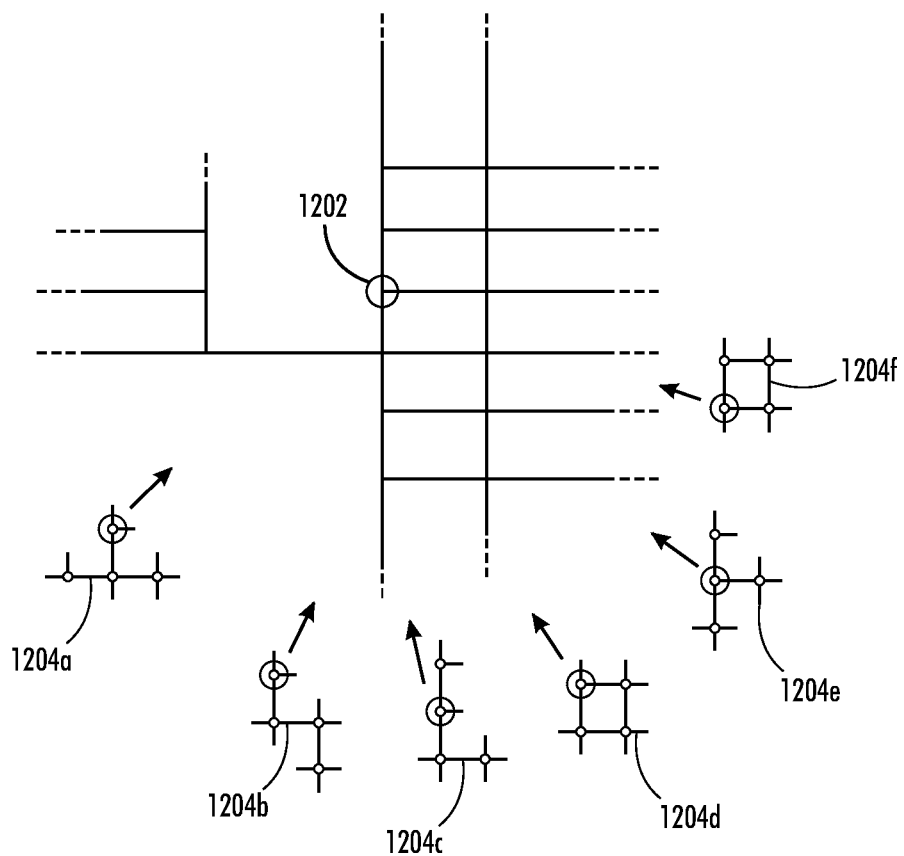
FIG. 12 illustrates why a feature vector whose elements are pure (or straight) mapping counts does not perform well for line art clustering and classification.

As shown in FIG. 12, the circled junction 1202 is covered in overlapping ways by mappings by the subgraphs 1204 shown, plus more not shown. As noted above, such overlaps cause junctions or regions to become unevenly represented in a mapping count feature vector.

To resolve this, feature vectors based on Junction-Normalized Mapping Count (JNMC) are used. A Junction-Normalized Mapping Count is computed on a per-level basis. In other words, all of the graph lattice node mappings $m_i$ for nodes at a certain level are computed, and these are used to normalize mapping counts for all nodes at that level. The mapping counts for each level's mappings are normalized independently from one another.

For level L, a weighting $w_j$ is computed for each junction j in the observed data graph:

$$w_j = \frac{1}{N(j)} \quad (3)$$

where N(j) is the number of mappings from all nodes at level L that include junction j. Then, the Junction-Normalized Mapping Count element $C_i$ for graph lattice node i is $$c_i = \sum_{m_i} \sum_{j \in m_i} w_j \quad (4)$$

where $m_i$ is the set of mappings onto the observed data graph by graph lattice node i. In other words, the junction-normalized count vector element corresponding to a given graph lattice node is taken as the sum of junction weights for all junctions mapped by that graph lattice node, summed over all mappings of that graph lattice node onto the observed data graph.

The Junction Normalized Mapping Count serves to give each junction in an observed data graph an equal weight toward building a feature vector of counts of mappings of subgraphs represented by graph lattice nodes. Through the formulas above, these weights get distributed among the mappings that include each junction. If a junction is mapped only once or a few times, it gives a strong contribution to the counts. If on the other hand a junction is covered by many overlapping mappings, these mappings must all share that junction's contribution weight. The junction normalization formula prevents some graph lattice nodes from dominating the feature vector when they happen to have many overlapping mappings, which can happen where there is repeated structure.

4.2 Similarity Measure: Common Minus Difference Measure

It is standard practice to compare feature vector representations for data for purposes of clustering and classification. Different formulas may be used to arrive at a similarity/dissimilarity score. Obvious choices include Euclidean distance and cosine distance. However, neither of these choices has been found to work well. For example, cosine distance does not work well for comparing feature vectors derived from counts of mappings of subgraphs onto observed data graphs. Accordingly, the following similarity measure, called Common Minus Difference (CMD), is used:

$$s(v_1, v_2) = \frac{\sum_i (\min(v_{1,i}, v_{2,i}) - |v_{1,i} - v_{2,i}|)}{\max(|G_1|, |G_2|) * N} \quad (5)$$

where $G_k$ is the size (number of junctions) of data graph k and N is the number of subgraph sizes considered in the junction-normalized feature vector.

While the popular cosine distance is designed to compare distributions or relative values of vector elements, CMD distance also compares absolute magnitudes on an element-by-element basis. Whereas cosine distance will give credit to any pairs of feature elements that both have positive count, the behavior of CMD is more strict. Positive credit is given to the extent the count is similar, but negative credit is given to the extent the counts differ. Due to the normalization term based on the sizes of the data graphs being compared, the range of the CMD similarity measure is −2 (minimum, least similarity) to 1 (maximum, best similarity).

4.3 Image Classification and Clustering

A useful application of the subject matter disclosed in the discussion heretofore is image clustering. Image clustering uses the graph lattice representation, subgraph mappings, Junction-Normalized Mapping Count vectors, and the Common-Minus-Difference similarity measure to achieve excellent image clustering for document images. Under Junction-Normalized Mapping Count and CMD, testing has shown that higher order subgraph features lead to improved discrimination.

To cluster images, a simple greedy clustering algorithm can be employed. Under the greedy clustering algorithm two thresholds are set: a "clearly same-cluster threshold" and a "clearly different-cluster threshold". These thresholds may be set manually, but may also be estimated automatically from a histogram of pairwise CMD distances for a representative sampling of images. The algorithm takes as input a corpus of images to be clustered.

For each image in the corpus, the algorithm finds the best-matching cluster. The best score between the image and images that are already members of clusters determine the best-matching cluster for an image. This is equivalent to an image classification process which assigns an image to a category on the basis of nearest neighbor, or best score to sample members the categories. The best score is determined using CMD on feature vectors determined using Junction-Normalized Mapping Counts.

After finding the best-matching cluster for an image, the image is grouped. If the best-matching cluster similarity to the image is greater than the clearly same-cluster threshold, then the image is added to the best-matching cluster. If the best-matching cluster similarity to the image is less than the clearly different-cluster threshold, then the image is added to a new cluster with the image as its only member. If the best-matching cluster similarity is between the clearly same-cluster threshold and the clearly different-cluster threshold, the image is put aside into an "unknown" category until all images have been considered.

Once all the images in the corpus have been grouped, each unknown image is revisited. In certain embodiments, the unknown images are assigned to their best-matching cluster. In other embodiments, an attempt is made to add the unknown images to the existing clusters as described above. Under such embodiments, any images failing to exceed the clearly same-cluster threshold are added to a new cluster called "leftovers."

Figure 13:
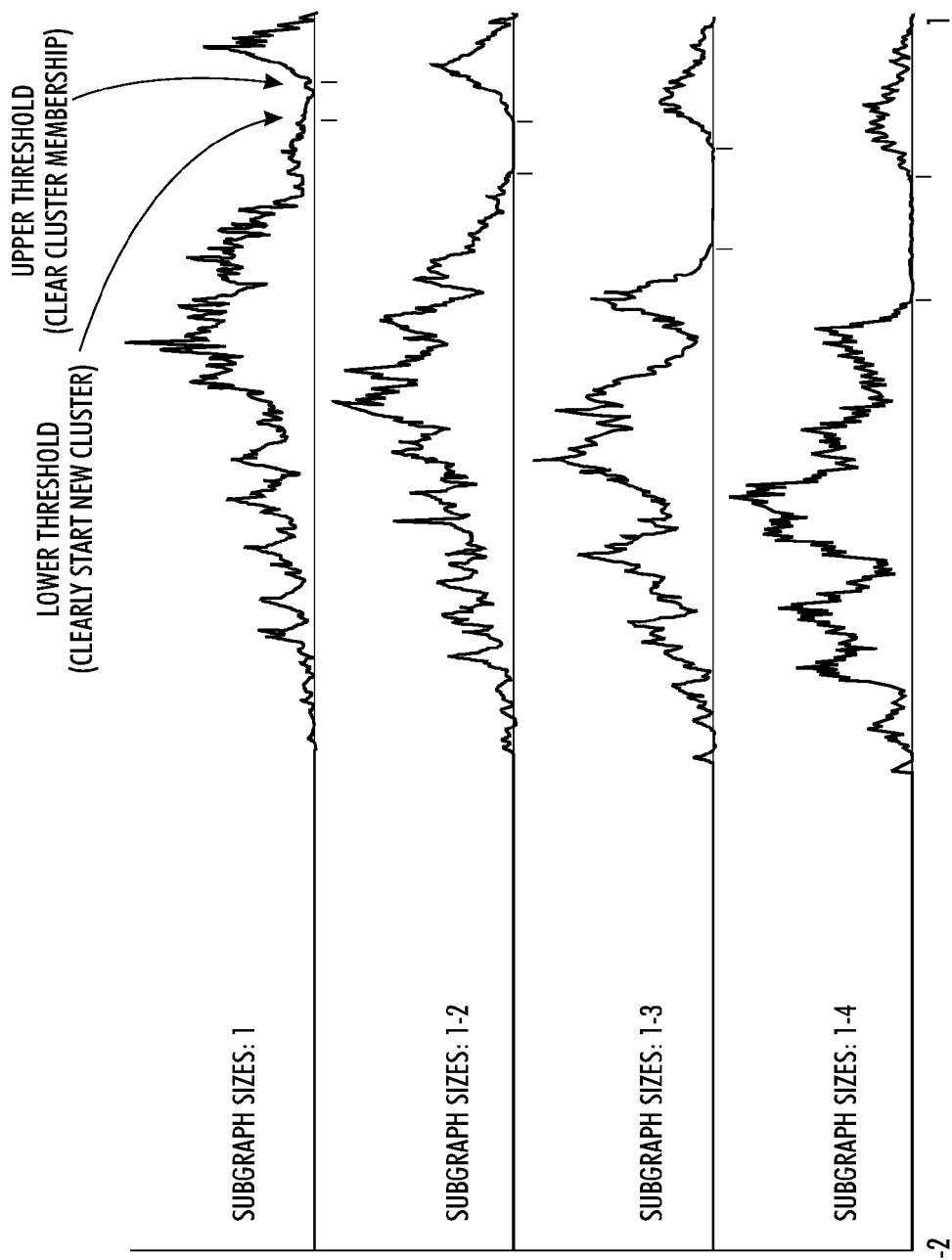
FIG. 13 illustrates pairwise similarity histograms of 200 NIST documents using feature vectors up to subgraph size 4.

The greedy clustering algorithm was tested on a data corpus of National Institute of Standards and Technology (NIST) tax forms, which consists of 11,185 images, of size 2560× 3300 pixels, representative of scanned handfilled and typed United States Tax Forms. Using feature vectors comprising subgraphs of sizes 1-3 or 1-4, the clustering algorithm correctly sorted all 11,185 NIST images into their respective 20 categories, with one category split into two. FIG. 13 presents pairwise similarity histograms of 200 NIST documents using feature vectors up to subgraph size 4. For the NIST data, beyond subgraph feature size 2, different image categories are clearly separated. Finally, clustering results are presented in FIG. 14.

Quality of clustering is scored as the edit-distance to the groundtruth correct assignment of images to categories. One edit operation is tallied for each incorrectly classified document, and one edit operation is tallied for merging any two clusters representing the same groundtruth category. Since the only error was is an extra cluster duplicating one of the groundtruth categories, forms clustering and classification is almost 100% correct for subgraphs of size 3 and larger.

Notwithstanding that a greedy clustering algorithm was discussed above, other clustering algorithms building on the concepts disclosed herein are equally amenable.

Another useful application of the subject matter disclosed in the discussion heretofore is image classification. Image classification uses the graph lattice representation, subgraph mappings, Junction-Normalized Mapping Count vectors, and the Common-Minus-Difference. Image classification can be performed in the same way as clustering through the use of one or more exemplars of each category for classification. Namely, for each image to be categorized, the algorithm finds the best-matching group of exemplars, where the best score between images and exemplars determines the best-matching group. As above, the best score is determined using CMD on feature vectors determined using Junction-Normalized Mapping Counts.

4.4 Image Indexing, Storage and Retrieval

The graph lattice can serve as a basis for fast image storage and retrieval. Matching of a graph lattice onto an observed data graph involves building the MappingSets of mappings of graph lattice node subgraphs onto subgraphs of the data graph. These mappings record the identity and placement of the mapping. When a new image is observed, the other images mapped by each graph lattice node, and therefore sharing common structure, are retrieved from these mappings. Under conditions of imperfect data graphs such as caused by noise and sample variation, well-known voting methods can be used to select images from the observed samples that share many subgraphs in common with the target.

4.5 Detecting Common Structure and Repeated Structure

The graph lattice can serve as a basis for detecting repeated structure within an image. Matching of a graph lattice onto an observed data graph involves building the MappingSets of mappings of graph lattice node subgraphs onto subgraphs of the data graph. Multiple mappings to different regions of the same image indicate repeated structure in that image. Note that many overlapping subgraphs are found to be repeated, not just subgraphs corresponding to human intuition about repeated parts.

Figures 14, 15:
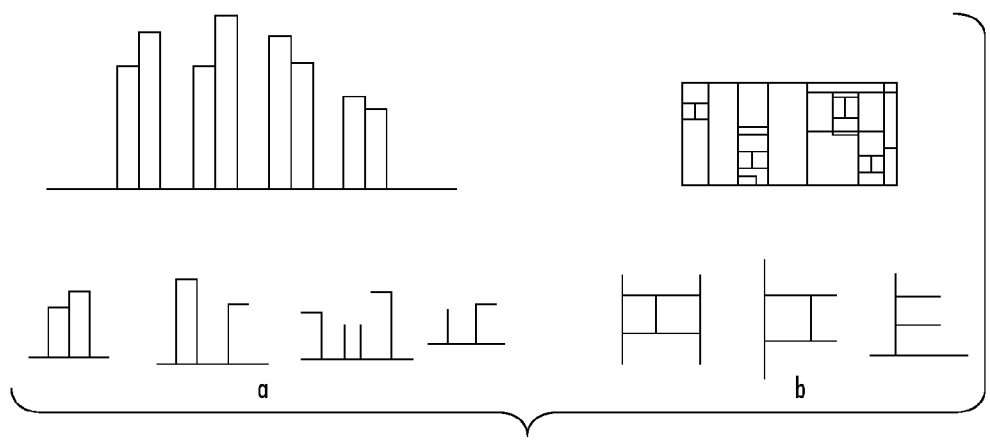
FIG. 14 illustrates results from clustering 11,185 NIST tax forms.
FIG. 15 illustrates periodic repeated structure and isolated repeated structure.

As shown in FIG. 15, repeated structure occurs in two major categories: 1) periodic repeated structure; and 2) isolated repeated structure. Periodic repeated structure (shown as "a" of FIG. 15) occurs when a repeated structure region shares a border with itself. This leads to the problem of aliasing or phase ambiguity in defining the boarders of the repeated pattern. Isolated repeated structure (shown as "b" of FIG. 15) occurs when the material surrounding the repeated region generally differs from one instance of the region to the next.

A graph lattice node at level L represents structure repeated R times when there exists a graph lattice node at level $$\frac{L}{R}$$

that maps exactly R times to the subgraph represented by the target node without overlap. Such repeating nodes can be detected by testing each node at each level L in turn. The subgraph represented by the target node is formed and then straightforward algorithms for subgraph matching are used to match candidate nodes at level $$\frac{L}{R},$$

one at a time, it a candidate node has exactly R mappings, a determination is made as to whether each junction of the target subgraph is mapped once and exactly once by the R mappings. If so, then the target level L node is a repeated structure node, and the repeated structure it contains is represented by the candidate level $$\frac{L}{R}$$

node. This method has been tested and shown to detect repeated structures up to size 6 junctions, in bar charts.

5.0 SYSTEM IMPLEMENTATION

Figure 16:
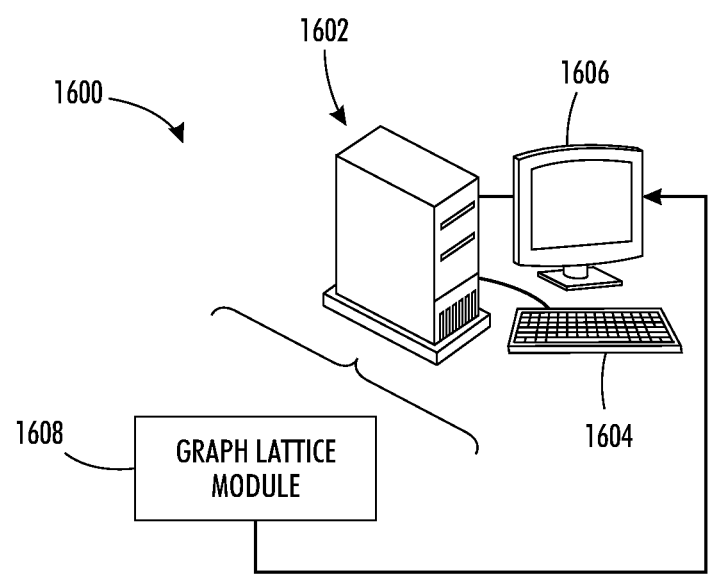
FIG. 16 illustrates a graph lattice system.

With reference to FIG. 16, a graph lattice system 1600 is illustrated. Suitably, a computer 1602 or other digital/electronic processing device, including storage and a digital/electronic processor, such as a microprocessor, microcontroller, graphic processing unit (GPU), etc., embody the system 1600. In other embodiments, the system 1600 is embodied by a server including a digital processor and including or having access to digital data storage, such server being suitably accessed via the Internet or a local area network, or by a personal data assistant (PDA) including a digital processor and digital data storage, or so forth.

The computer 1602 or other digital processing device suitably includes or is operatively connected with one or more user input devices such as an illustrated keyboard 1604 for receiving user input to control the system 1600, and further includes or is operatively connected with one or more display devices such as an illustrated display 1606 for displaying output generated based on the output of the system 1600. In other embodiments, the input for controlling the system 1600 is received from another program running previously to or concurrently with the system 1600 on the computer 1602, or from a network connection, or so forth. Similarly, in other embodiments the output may serve as input to another program running subsequent to or concurrently with the system 1600 on the computer, or may be transmitted via a network connection, or so forth.

The system 1600 includes a graph lattice module 1608 that implements one or more aspects of the graph lattice, and methods and/or algorithms using the same, of the present application. In certain embodiments, the graph lattice module 1608 receives a corpus of one or more images from a source external to the module 1608 and generates a graph lattice therefrom. In some of such embodiments, the graph lattice module 1608 further receives a target image, which it uses to retrieve similar images from the corpus. In other of such embodiments, the graph lattice module performs clustering on the corpus of images and/or identifies repeating subgraphs within the corpus.

In some embodiments, the graph lattice module 1608 is embodied by a storage medium storing instructions executable, for example, by a digital processor). The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 17:
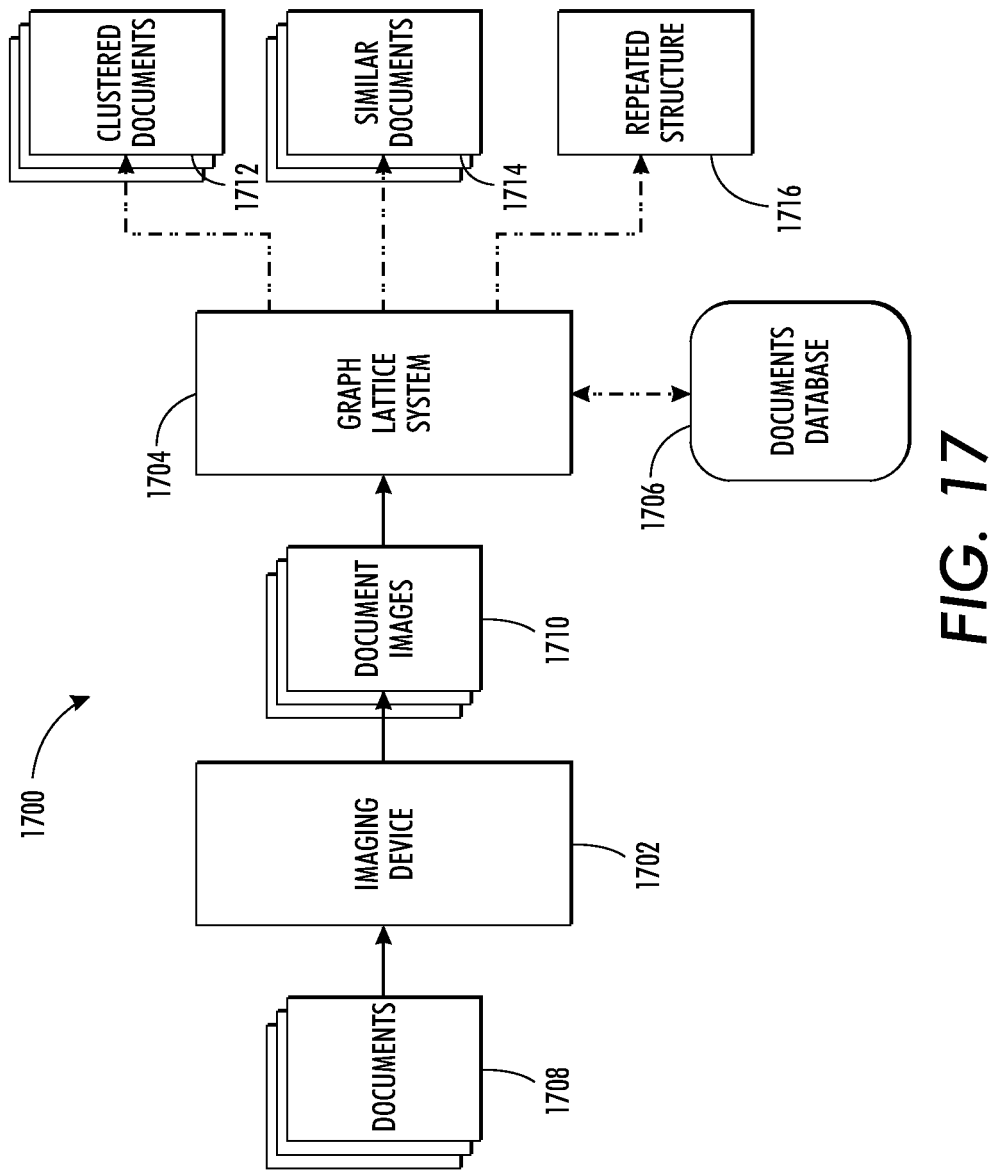
FIG. 17 illustrates a computer vision system applied to document recognition using a graph lattice system.

With reference to FIG. 17, a computer vision system 1700 using the graph lattice system 1600 of FIG. 16 is illustrated. The computer vision system 1700 includes an imaging device 1702 and the graph lattice system 1704 of FIG. 16. In certain embodiments, the computer vision system 1700 further includes a documents database 1706 operatively connected to the computer vision system 1704, for example, by a communications network. The documents database 1706 is a database of document images, where the document images are generated via a device such as the imaging device 1702.

The imaging device 1702 receives one or more documents 1708 and converts them into document images 1710. The imaging device may be a camera, scanner, or other like device. Further, the imaging device 1702 may receive the documents via a conveyor path extending from a feed tray.

The graph lattice system 1704 then receives the document images 1710 and performs one or more tasks using them. The graph lattice system 1704 may receive the document images 1710 electronically via a communications network. Further, the one or more tasks may include one of more of clustering the document images 1710 to generate clustered document images 1712, finding similar document images 1714 within the documents database 1706, and finding repeated structure 1716 within the document images 1710. Notwithstanding the shown tasks, it is to be appreciated that the graph lattice system 1704 can carry out additional tasks not shown (e.g., document classification).

Under a scenario where the graph lattice system 1704 is used to generated clustered document images 1712, the document images 1710 are clustered as described in connection with Section 4.3 (Image Classification and Clustering) to define the clustered document images 1712. Namely, CMD similarity scores comparing the document images 1710 are generated using a graph lattice of the document images 1710 and used to cluster the document images 1710.

Once the graph lattice system 1704 clusters the document images 1710, the documents 1708 and/or the document images 1710 are processed as necessary. For example, the documents 1708 may be routed via conveyer paths to a destination based upon their cluster. Alternatively, or in addition, the document images 1710 may be stored in a database and/or stored within a file system according to their cluster.

Under a scenario where the graph lattice system 1704 is used to find similar document images 1714, the document images 1710 are used to retrieve similar document images 1714 from the documents database 1706. This is performed as described in connection with Section 4.4 (Image Indexing, Storage and Retrieval). Namely, a graph lattice of the document images in the documents database 1706 is mapped to the document images 1710. Simple voting methods are then used to find document images in the documents database 1706 having the most structure in common with the document images 1710.

Once the graph lattice system 1704 finds the similar document images 1714, they may be processed as necessary. For example, the similar document images 1714 may be stored in a database and/or stored within a file system. Alternatively, or in addition, they may be provided to an operator of the computer vision system 1700 via a display and/or a printer.

Under a scenario where the graph lattice system 1704 is used to find repeated structure 1716, the document images 1710 are searched for repeating structures. This is performed as described in connection with Section 4.5 (Detecting Common Structure and Repeated Structure). The document images 1710 are used to generated a graph lattice and then repeating nodes are detected by testing each node at each level L in turn with the understanding that a graph lattice node at level L represents structure repeated R times when there exists a graph lattice node at level $$\frac{L}{R}$$

that maps exactly R times to the subgraph represented by the target node without overlap. Once the graph lattice system 1704 finds the repeated structure 1716, the repeated structure may be processed as necessary. For example, it may be provided to an operator of the computer vision system 1700 via a display and/or a printer

6.0 CONCLUSION

Graph lattices and the algorithm applying the same facilitate efficiency, accuracy, and scalability in image clustering, classification, similar and duplicate image indexing and retrieval, and repeated structure detection. Efficiency derives from the algorithms for computing mappings to subgraphs that build from simple patterns to more complex patterns in a graph lattice. Accuracy derives from the redundancy in the graph lattice by the storage of a very large set of subgraphs in the graph lattice. Scalability derives from the algorithm we disclose to grow large graph lattices (that are still much smaller than the space of all subgraphs) that are tailored to observed data.

The exemplary embodiments have been described with reference to the preferred embodiments. Obviously, modifications and alterations will occur to others upon reading and understanding the preceding detailed description. For example, but not being limited to, the following variants are viewed as foreseeable.

(vi.) Methods for adaptively growing a graph lattice from observed data. An especially important issue is to grow paths deeply into the graph lattice thereby representing large subgraphs, without devoting nodes to the explosions of smaller subgraphs. This means selectively growing paths to high level nodes yet with enough redundancy to obtain noise tolerance.

(vii.) Methods for selectively computing mappings of a graph lattice onto data according to task or data-dependent contingencies.

(viii.) Methods for analyzing the mapping counts of graph lattices on data samples to discover clusters, repeated structures, and exceptional patterns.

(ix.) Methods for selecting graph lattice nodes to participate in feature vectors for embeddings, kernel methods, and other statistical pattern recognition methods.

It is intended that the exemplary embodiments be construed as including all such modifications and alterations insofar as they come within the scope of the appended claims or the equivalents thereof.

The invention claimed is:

1. A method for clustering a plurality data graphs, wherein the plurality of data graphs are comprised of primitives and relations, said method comprising:
generating a graph lattice comprised of a graph of related subgraphs, wherein subgraphs of degree 1 are the primitives and each subgraph of degree i>1 is comprised of a subgraph of degree i−1 and one of the primitives, wherein the graph lattice is a lattice of nodes, and wherein each node corresponds to a subgraph representing image primitives and relations, and each graph lattice node is configured to provide descriptive information about the subgraph to which the graph lattice node corresponds;
using the graph lattice to generate feature vectors for the plurality of data graphs;
clustering the plurality of data graphs according to similarity between the generated feature vectors, wherein the method is performed using at least one digital processor; and
a strut consisting of a parent graph lattice node at level N, a primitive, and a child graph lattice node at level N+1 which is the subgraph consisting of the parent graph lattice node subgraph plus the primitive linked to the perimeter of the parent graph lattice node subgraph.

2. The method of claim 1, wherein the feature vectors are determined using junction-normalized mapping counts.

3. The method of claim 1, wherein a junction-normalized mapping count is a subgraph matching count reweighted by junction mapping counts.

4. The method of claim 1, wherein the similarity between the generated feature vectors is determined using a common minus difference measure.

5. The method of claim 4, wherein the common minus difference measure compares absolute magnitudes on an element-by-element basis.

6. The method of claim 1, wherein the graph lattice is generated from the plurality of data graphs.

7. The method according to claim 1, wherein each level of the graph lattice acts as a base for a next layer.

8. The method of claim 1, wherein the strut maintains a junction index mapping between the parent graph lattice node and the child graph lattice node and indicates the primitive type, placement on the parent, and links for a junction that constructs the child from the parent.

9. The method of claim 1, wherein the primitives include a plurality of distinct primitives having distinct junctions.

10. A method for clustering a plurality of data graphs, wherein the plurality of data graphs are comprised of primitives and relations, said method comprising:
generating a graph lattice comprised of a graph of related subgraphs, wherein subgraphs of degree 1 are the primitives and each subgraph of degree i>1 is comprised of a subgraph of degree i−1 and one of the primitives;
using the graph lattice to generate feature vectors for the plurality of data graphs; and,
clustering the plurality of data graphs according to similarity between the generated feature vectors, wherein the clustering includes:
finding a best-matching cluster for each of the plurality of data graphs using the feature vectors;
determining a similarity score for the each of the plurality of data graphs based on the each of the plurality of data graphs best-matching cluster;
grouping the each of the plurality of data graphs with the each of the plurality of data graphs best-matching cluster if the each of the plurality of data graphs similarity score exceeds a first threshold;
grouping the each of the plurality of data graphs in a new cluster if the each of the plurality of data graphs similarity score is less than a second threshold; and
grouping the each of the plurality of data graphs in an unknown cluster if the each of the plurality of data graphs similarity score is between the first threshold and the second threshold;
wherein the method is performed using at least one digital processor.

11. The method of claim 10, wherein the best-matching cluster for the each of the plurality of data graphs is determined by examining data graphs within existing clusters to find a cluster having a data graph with a feature vector most similar to the each of the plurality of data graphs.

12. The method of claim 10, wherein data graphs in the unknown cluster are re-clustered when all of the plurality of data graphs are clustered.

13. A method for categorizing a data graph, wherein the data graph is comprised of primitives and relations, said method comprising:
generating a graph lattice comprised of a graph of related subgraphs, wherein subgraphs of degree 1 are the primitives and each subgraph of degree i>1 is comprised of a subgraph of degree i−1 and one of the primitives, wherein the graph lattice is a lattice of nodes, and wherein each node is at level N and corresponds to a subgraph representing image primitives and relations, the subgraph being a subgraph corresponding to a parent graph lattice node at level N−1 plus a primitive linked to the perimeter of the subgraph corresponding to the parent graph lattice node, and wherein each graph lattice node is configured to provide descriptive information about the subgraph to which the graph lattice node corresponds;
using the graph lattice to generate feature vectors for the data graph and exemplars of a first category;
comparing the generated feature vectors for the data graph and the exemplars of the first category;
categorizing the data graph as a member of the first category if similarity between the feature vectors of an image and the exemplars exceeds a threshold, wherein the method is performed using at least one digital processor; and, a strut consisting of the parent graph lattice node at level M, the primitive, and a child graph lattice node at level M+1 which is the subgraph consisting of the parent graph lattice node subgraph plus the primitive linked to the perimeter of the parent graph lattice node subgraph.

14. The method of claim 13, wherein the feature vectors are determined using junction-normalized mapping counts.

15. The method of claim 14, wherein a junction-normalized mapping count is a subgraph matching count reweighted by junction mapping counts.

16. The method of claim 13, wherein the similarity between the feature vectors is determined using a common minus difference measure.

17. The method of claim 16, wherein the common minus difference measure compares absolute magnitudes on an element-by-element basis.

18. The method of claim 13, wherein the graph lattice is generated from the data graph.

19. A system carried on a non-transitory readable medium capable of being read by at least one electronic processor, including steps for clustering a plurality data graphs, wherein the plurality of data graphs are comprised of primitives and relations, said system comprising:

generating a graph lattice comprised of a graph of related subgraphs, wherein subgraphs of degree 1 are the primitives and each subgraph of degree i>1 is comprised of a subgraph of degree i−1 and one of the primitives;

using the graph lattice to generate feature vectors for the plurality of data graphs; and, clustering the plurality of data graphs according to similarity between the generated feature vectors, wherein the clustering includes:

finding a best-matching cluster for each of the plurality of data graphs using the feature vectors;

determining a similarity score for the each of the plurality of data graphs based on the each of the plurality of data graphs best-matching cluster;

grouping the each of the plurality of data graphs with the each of the plurality of data graphs best-matching cluster if the each of the plurality of data graphs similarity score exceeds a first threshold;

grouping the each of the plurality of data graphs in a new cluster if the each of the plurality of data graphs similarity score is less than a second threshold; and grouping the each of the plurality of data graphs in an unknown cluster if the each of the plurality of data graphs similarity score is between the first threshold and the second threshold;

wherein the system is performed using at least one digital processor.

* * * * *